(12) United States Patent
Jacob Da Silva et al.

(10) Patent No.: US 9,059,940 B2
(45) Date of Patent: Jun. 16, 2015

(54) SYSTEM AND METHOD FOR TRANSPORT CONTROL PROTOCOL IN A MULTI-CHASSIS DOMAIN

(75) Inventors: Roberto H. Jacob Da Silva, Oak Park, CA (US); Chung-Hua Amy Chang, Temple City, CA (US); Anand Vinayagam, Oak Park, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 304 days.

(21) Appl. No.: 13/010,343

(22) Filed: Jan. 20, 2011

(65) Prior Publication Data

US 2012/0033541 A1    Feb. 9, 2012

Related U.S. Application Data

(60) Provisional application No. 61/370,622, filed on Aug. 4, 2010.

(51) Int. Cl.
| | |
|---|---|
| *H04J 3/24* | (2006.01) |
| *H04L 12/939* | (2013.01) |
| *H04L 12/709* | (2013.01) |
| *H04L 12/713* | (2013.01) |
| *H04L 12/707* | (2013.01) |
| *H04L 12/703* | (2013.01) |

(52) U.S. Cl.
CPC ............. *H04L 49/552* (2013.01); *H04L 45/22* (2013.01); *H04L 45/245* (2013.01); *H04L 45/28* (2013.01); *Y02B 60/33* (2013.01); *H04L 45/586* (2013.01)

(58) Field of Classification Search
CPC .................... H04L 45/245; H04L 49/552
USPC ................................. 370/349, 473
See application file for complete search history.

(56) References Cited

U.S. PATENT DOCUMENTS

| | | | |
|---|---|---|---|
| 7,161,948 B2 | 1/2007 | Sampath et al. | |
| 7,173,934 B2 | 2/2007 | Lapuh et al. | |
| 8,305,878 B1 * | 11/2012 | Bishara et al. ............... | 370/216 |
| 8,582,423 B2 * | 11/2013 | Page et al. ................. | 370/217 |
| 2003/0053470 A1 * | 3/2003 | Divivier ...................... | 370/412 |
| 2008/0219237 A1 * | 9/2008 | Thubert et al. ............... | 370/349 |
| 2008/0228943 A1 * | 9/2008 | Balus et al. .................. | 709/239 |
| 2010/0002703 A1 * | 1/2010 | Kogata et al. ............... | 370/392 |
| 2010/0020680 A1 * | 1/2010 | Salam et al. ................. | 370/225 |
| 2010/0329110 A1 * | 12/2010 | Rose et al. ................... | 370/217 |
| 2011/0222536 A1 * | 9/2011 | Saavedra ..................... | 370/391 |
| 2012/0020206 A1 * | 1/2012 | Busi et al. .................... | 370/217 |
| 2012/0033668 A1 * | 2/2012 | Humphries .................. | 370/390 |
| 2012/0033672 A1 * | 2/2012 | Page et al. ............... | 370/395.53 |
| 2012/0182866 A1 * | 7/2012 | Vinayagam et al. .......... | 370/228 |
| 2012/0236730 A1 * | 9/2012 | Zhou et al. ................... | 370/244 |
| 2013/0064102 A1 * | 3/2013 | Chang et al. ................ | 370/244 |
| 2013/0064137 A1 * | 3/2013 | Santoso et al. ............... | 370/254 |
| 2013/0073711 A1 * | 3/2013 | Hanka et al. ................. | 709/223 |
| 2013/0077621 A1 * | 3/2013 | Da Silva et al. ............. | 370/355 |
| 2013/0336317 A1 * | 12/2013 | Mithyantha et al. .......... | 370/390 |

* cited by examiner

*Primary Examiner* — Hassan Kizou
*Assistant Examiner* — Deepa Belur
(74) *Attorney, Agent, or Firm* — Garlick & Markison

(57) ABSTRACT

Aggregation switches connected to an edge node by a multi-chassis link aggregation group, wherein the aggregation switches are connected by a virtual fiber link that provides a connection for exchange of information between the Aggregation Switches regarding MAC addressing to synchronize MAC address tables. A transport control protocol defines a VLAN and multicast group of ports on the Aggregation Switch to receive management or control packets.

19 Claims, 12 Drawing Sheets

Overview of VFL/MC-LAG

| Source HDI 302 | Destination HDI 304 | VLAN ID 306 | Packet Type 308 | Source MAC Address 310 | Destination MAC Address 312 |
|---|---|---|---|---|---|
| PM Port ID 502 MID of Switching ASIC 504 | | Transport VLAN ID 508 | Multicast index 510 | MAC Address of Aggregate Switch 512 | Multicast group address 514 |

Pre-Pended Header for Protocol Packet 500

Fig. 12

SYSTEM AND METHOD FOR TRANSPORT CONTROL PROTOCOL IN A MULTI-CHASSIS DOMAIN

CROSS-REFERENCE TO RELATED PATENTS

The present U.S. Utility patent application claims priority pursuant to 35 U.S.C. §119(e) to U.S. Provisional Application Ser. No. 61/370,622, entitled, "MULTI-CHASSIS VIRTUAL-FABRIC LINK AGGREGATION SYSTEM," filed Aug. 4, 2010, which is incorporated by reference herein and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC) and fiber to the home. Edge nodes may perform, for example, L2 switching functions for the attached devices. The edge nodes are generally connected to an aggregate layer that terminates access links coming from multiple edge nodes. Switches residing at the aggregation layer are known as aggregation switches. Aggregation switches may perform, for example, L2 switching and L3 routing of traffic received via the aggregate links from the edge nodes. The aggregate layer is connected to a metro or core network layer that performs Layer 3/IP routing of traffic received from the aggregation switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite periodic component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for routing traffic flows through the network. As will be appreciated, detection and convergence times must occur quickly (advantageously, less than one second) to achieve seamless transition to the alternate paths.

Ethernet protocol is a transport technology that is used ubiquitously in local area networks (LAN), such as the home and enterprise networks to communicate between computers and networks. However, the use of Ethernet protocol technology in access and aggregate networks, as well as metro networks, is continuing to rise and to revolutionize the edge network as it did the enterprise network. As an access technology, Ethernet offers significant advantages over other access technologies, such as: (i) future-proof transport for data, video and voice applications; (ii) cost-effective infrastructure for data services; and (iii) simple, globally accepted standard that will ensure interoperability.

In order to adapt Ethernet technology to a carrier-grade service environment in edge and aggregate layer networks, a number of issues remain to be addressed, including resiliency to failures. In one known solution, the spanning tree protocol (STP) is commonly used to detect failures and divert traffic to alternate paths when failures occur in Ethernet networks. Generally, STP relies on multiple physical paths between switches, but with only one path active at any one time, the other path being placed in a blocking mode (defining an "active/passive" paradigm). When failures occur, an alternative path is brought out of the blocking mode into an active state, thereby re-establishing the connection.

However, STP can result in unacceptable convergence times (e.g., up to several seconds) in some network topologies, including without limitation, convergence between edge nodes and aggregation switches of a data network. Further, STP provides only for an active/passive operation paradigm whereby not all links are actively forwarding traffic at the same time.

Accordingly, there is a need for systems and methods for providing resiliency between nodes of one or more data networks, such as without limitation, between edge nodes and aggregation switches of an Ethernet network. There is a need for systems and methods for providing a communication control protocol that is resilient and adaptable to various types of network nodes.

BRIEF DESCRIPTION OF THE SEVERAL VIEWS OF THE DRAWINGS

FIG. 12 illustrates a schematic block diagram of an embodiment of a protocol packet in a transport control protocol in accordance with the present invention.

DETAILED DESCRIPTION OF THE INVENTION

Figure 1:
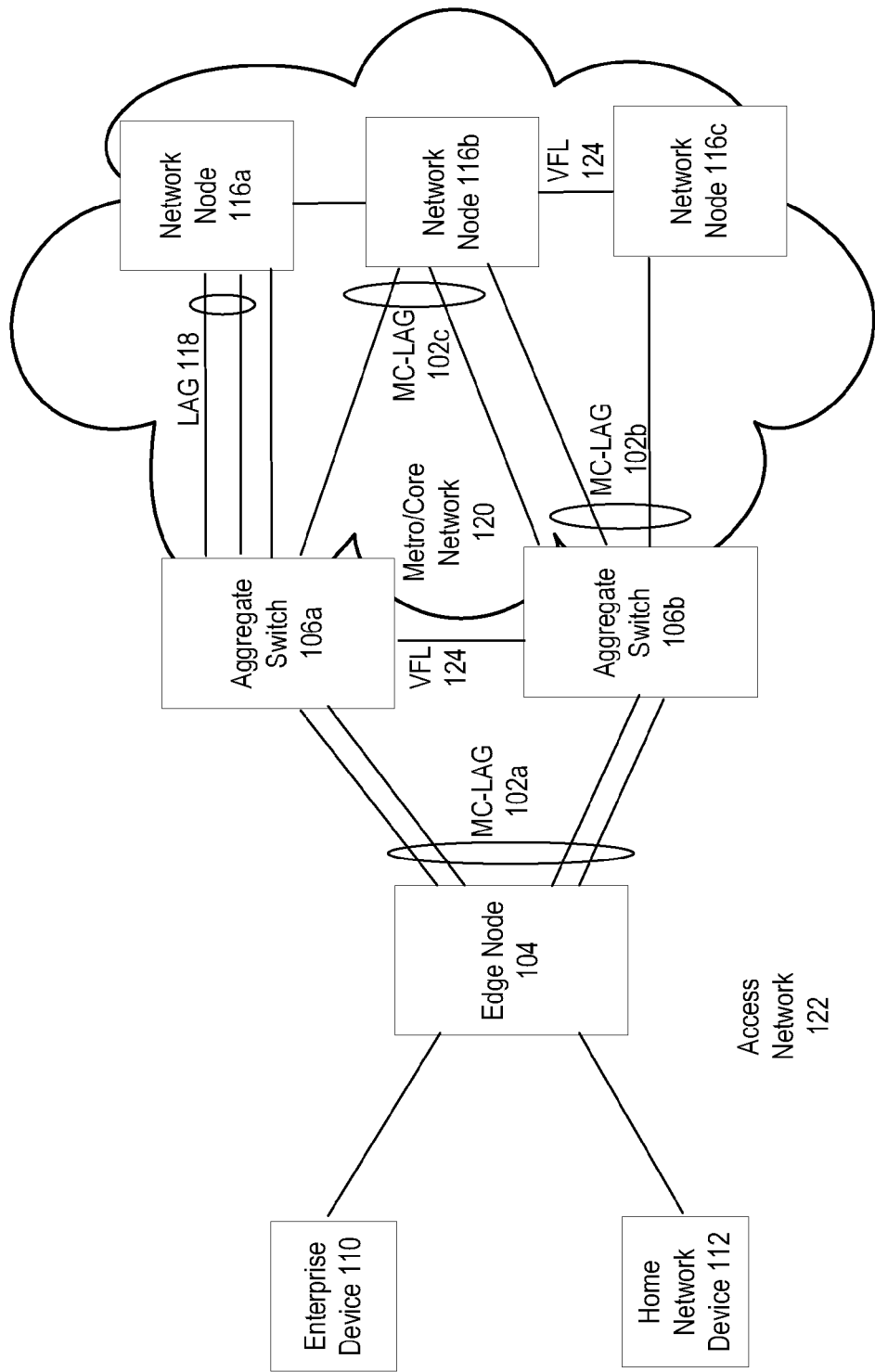
FIG. 1 illustrates a schematic block diagram of an embodiment of a network architecture in accordance with the present invention.

FIG. 1 illustrates an embodiment of a resilient network 100 with multi-chassis link aggregation that provides an active/active paradigm (i.e., all links actively forwarding traffic at the same time) that more fully utilizes the capacity of the network nodes. The following abbreviations are herewith defined:

CMM Chassis Management Module
IGMP Internet Group Management Protocol
IP Internet Protocol
IPMS Internet Protocol Multicast
LAG Link Aggregation
L2 Layer 2 ("Data Link Layer") of the OSI model for networks
L3 Layer 3 ("Network Layer") of the OSI model for networks
MAC Media Access Control Protocol
MC-LAG Multi-Chassis Link Aggregate Group
MC-VFA Multi-Chassis Virtual Fabric Aggregation
NIM Network Interface Module
STP Spanning Tree Protocol
VLAN Virtual Local Area Network
VRRP Virtual Router Redundancy Protocol
ASIC Application Specific Integrated Circuit The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

The LACP provides a method to control the bundling of several physical links, called a link aggregation group (LAG), between two peer nodes to form a single logical channel there between. The peer nodes negotiate the bundling of the physical links into a LAG by exchanging LACP packets, or alternatively the LAG can be configured manually. Link aggregation offers an inexpensive way to transfer more data than any one single port or link can deliver alone. In an embodiment, the ports of a LAG include the same physical type, such as all copper ports (CAT-5E/CAT-6), all multi-mode fiber ports (SX), or all single-mode fiber ports (LX). In another embodiment, the ports of a LAG may have a different physical type.

To provide increased resiliency and remove a single point of failure, a LAG is split across two devices as seen in FIG. 1 and is referred to herein as a multi-chassis link aggregation group (MC-LAG) 102. For example, in FIG. 1, MC-LAG 102a originates from edge node 104 and is split into two subsets and connected to two Aggregation Switches 106a and 106b, with one or more physical links of the MC-LAG 102a in each subset. In an embodiment, the edge node 104 may use load balancing techniques to distribute traffic across all available links of the MC-LAG 102a. For each packet transmitted over the MC-LAG 102a, one of the physical links is selected based on a load-balancing algorithm (usually involving a hash function operating on the source and destination Internet Protocol (IP) or Media Access Control (MAC) address information). Load balancing across the physical links of the MC-LAG 102 results in a more effective use of bandwidth.

As seen in FIG. 1, the edge node 104 is connected over an access network 122 to an enterprise network device 110, such as a bridge, switch, router, etc., that is operating in a LAN, and/or it may also be connected to a home network device 112, such as a DSL modem, set-top box, optical line terminal, etc. The edge node 104 is a switch or server and may functionally include a digital subscriber line access multiplexer (DSLAM), cable modem termination system (CMTS), optical line terminal (OLT), etc. in an embodiment but may include other types of devices as well.

In an embodiment, the Aggregation Switches 106 are coupled with a virtual fabric link (VFL) 124. The VFL 124 provides a connection for exchange of information between the Aggregation Switches regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the MC-LAG 102a. The Aggregation Switches 106 operate transparently to the edge node 104 and are treated as a single logical device by the edge node 104. The edge node 104 is able to actively forward traffic on the MC-LAG 102a while the synchronization of MAC address tables and other forwarding information between the Aggregation Switches 106 is driven by L2 packet flows over the VFL along with a reduced amount of control messaging in an embodiment. This feature enables dual homing of the edge node 104 to the pair of Aggregation Switches 106 and provides a Layer 2 multi-path intra-structure as well as basic Layer 3 access infrastructure. In addition, in an embodiment, the MC-VFA feature provides this functionality without requiring Layer 2 redundancy protocols (e.g. Spanning Tree) between the edge node 104 and Aggregation Switches 106, while still facilitating a carrier-grade detection and convergence time to edge uplink failures as well as aggregation/core switch failures. Many recent network designs, especially for data centers, are requiring an ever increasing number of layer 2 adjacencies between edge node and Aggregation Switches. This trend is pushing the limits of the spanning tree protocol, such as loop-detection function and convergence times. The spanning tree convergence time can be of up to several seconds in many current network topologies. The multi-chassis architecture in an embodiment provides a dual-homed, layer 2 multi-path connection between the edge node 104 and Aggregation Switches 106 preferably without needing to run the spanning tree protocol operation for loop prevention, while still being flexible enough to allow the spanning tree protocol operation along with the multi-chassis functionality in some of the portions of the network topology in an embodiment (e.g. between the Aggregation Switches over the virtual fabric link as well as over the links connecting these devices to upstream/ core switches).

The feature in some embodiments also facilitates fast failover detection and convergence times for access uplink failures, virtual fabric link failures and node failures. Another advantage of the MC-VFA architecture in an embodiment is the active/active forwarding mode of the edge node 104 whereby both sets of operational MC-LAG uplinks are processing traffic to increase efficiency of the use of bandwidth of the MC-LAG links.

As seen in FIG. 1, in an embodiment, the Aggregation Switches 106 are also connected to a metro or core network 120 that includes one or more network nodes 116, such as network switches and/or routers, using the MC-LAG functionality (as part of the M-VFA architecture) as described herein. For example, aggregate switch 106b is connected to network nodes 116b and 116c over MC-LAG 102b wherein the network nodes 116b and 116c exchange state information over a VFL as well. The MC-LAG 102b architecture provides a dual-homed, layer 2 multi-path connection between the aggregation switch 106b and network nodes 116b and 116c. In an embodiment, network nodes 116 can also be connected using MC-LAG functionality, as seen with MC-LAG 102c and VFL 124. The Aggregation Switches 106 may also be connected to the network nodes 116 using a standard LAG, such as LAG 118, or other trunks or links.

Figure 2:
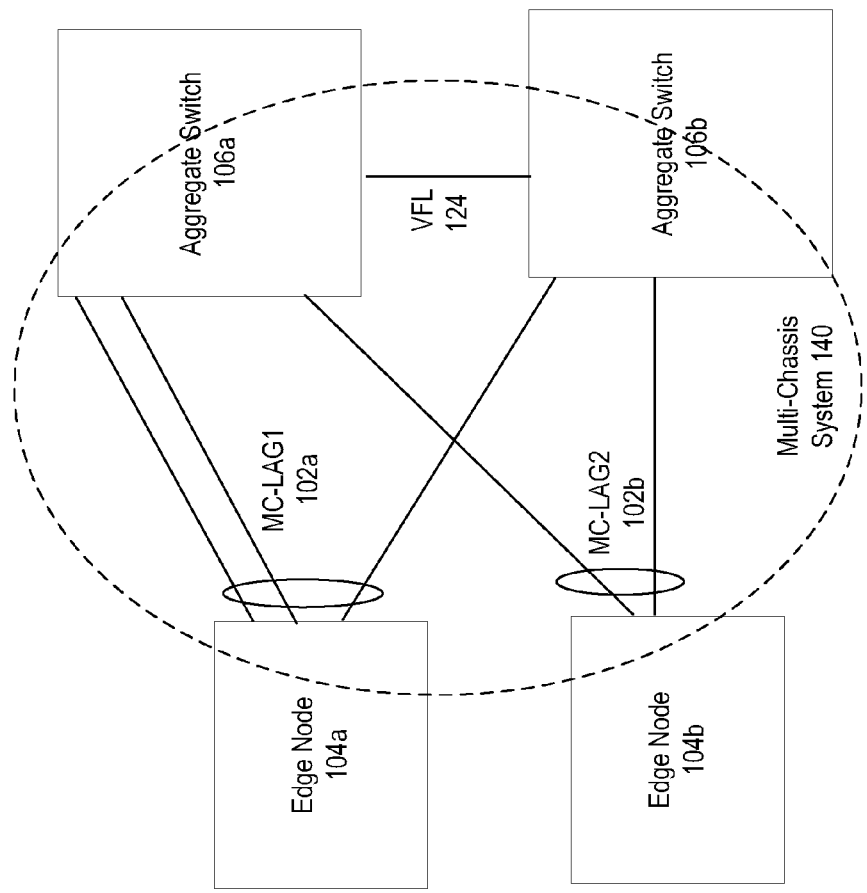
FIG. 2 illustrates a schematic block diagram of an embodiment of a multi-chassis domain in accordance with the present invention.

The MC-VFA architecture is now described in more detail with respect to FIG. 2. Edge node 104a is connected to Aggregation Switches 106a and 106b by a first MC-LAG1 102a while edge node 104b is connected to Aggregation Switches 104a and 104b by second MC-LAG2 102b. Each MC-LAG 102a and 102b includes a plurality of physical links divided into at least two subsets, wherein each of the two subsets includes at least one physical link. As seen in FIG. 2, the first set of MC-LAG 102a physical links are terminated at a first Aggregation Switch 106a while the second set of MC-LAG 102a physical links are terminated at a second Aggregation Switch 106b. MC-LAG1 forms logical dual homed, layer 2 multi-paths. The MC-LAG member ports are the external, user ports that are members of the MC-LAG 102. The VFL 124 is an aggregate of ports that in an embodiment span multiple network interface modules for resiliency and provides for inter-chassis traffic and control/state data transfer. The multi-chassis system 140 includes the Aggregation Switches 106, the virtual fabric link 124, the MC-LAG 102a, the MC-LAG 102b and their respective MC-LAG member ports attached to the downstream edge devices. The Aggregation Switches 106a and 106b are separate physical switches with each operable as a stand-alone switch and each encased by its own separate physical chassis. The aggregates switches 106a and 106b may be in the same geographic area, such as in a central office or data center, or may be separate geographic locations, such as different buildings or cities, to provide geo diversity.

The edge nodes 104 operating as MC-LAG clients attached to the Aggregation Switches can use different methods to assign traffic to the links within their aggregates as long as the choice of links remains fixed for a given flow. This ensures that traffic is delivered in-sequence between any pair of communicating end stations. In an embodiment, the same number of uplink ports from the edge devices to each one of the MC-LAG Aggregation Switches should preferably be configured. In other words, if two uplinks are configured between the edge switch and one of the MC-LAG Aggregation Switches, then two uplinks between the edge switch and the other multi-chassis switch should also be configured. Although not mandatory, this arrangement provides a more homogeneous traffic distribution for flows between the multi-chassis switches and the edge device.

Figure 3:
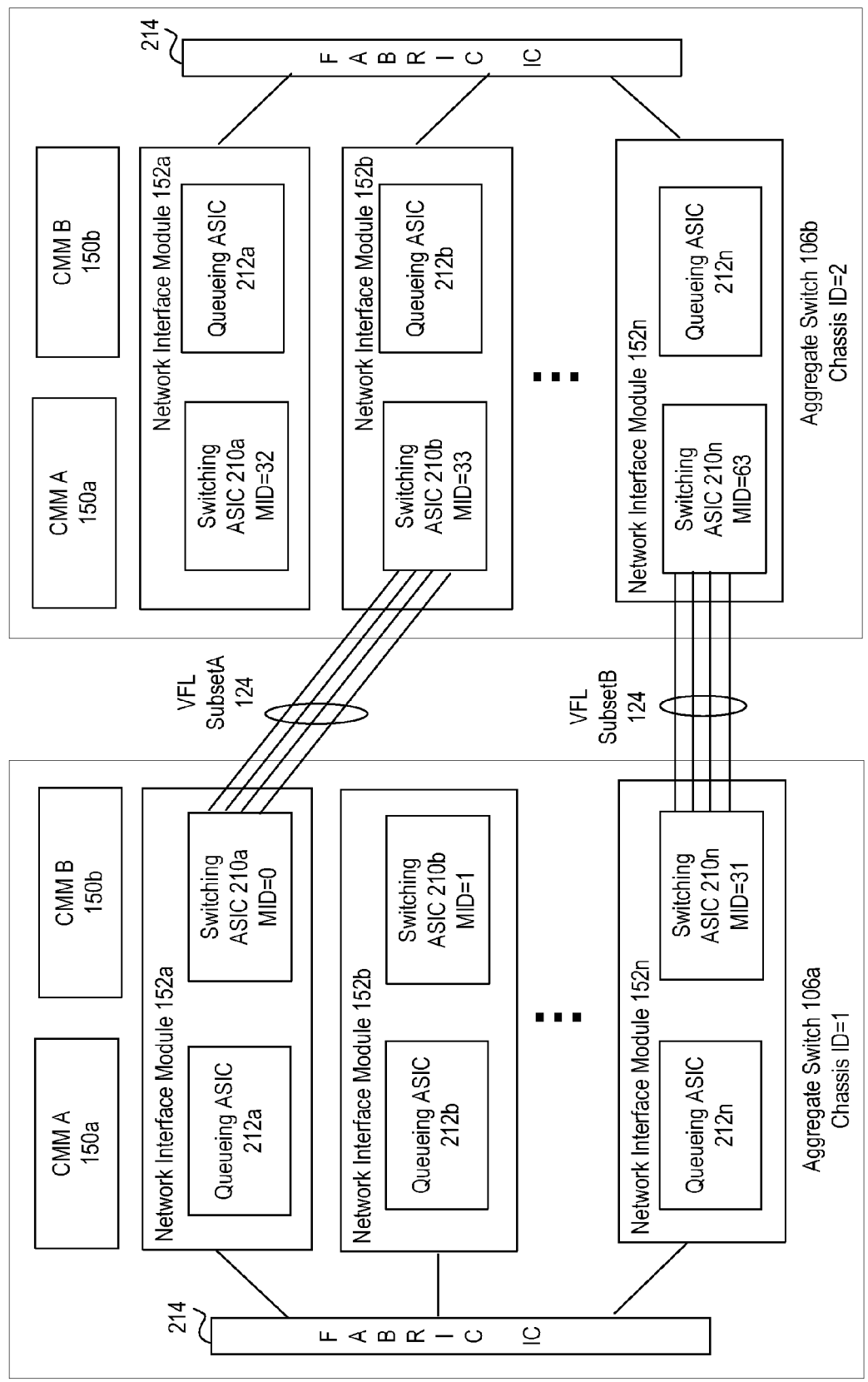
FIG. 3 illustrate a schematic block diagram of an embodiments of aggregate switches in a multi-chassis domain in accordance with the present invention.

The Virtual fabric link (VFL) 124 between the Aggregation Switches 106 is now described in more detail with respect to FIG. 3. The Aggregation Switches 106 in one embodiment each include at least one CMM module 150a (primary) and preferably a second CMM module 150b (back-up) as well as a plurality of Network Interface modules (NIM) 152, such as line cards or port modules. The VFL 124 is an aggregate of VFL member ports connected to one or more NIMs 152, in the first and second Aggregation Switches 106. For example, VFL 124 includes a first subset A of physical links between NIM 152a of Aggregation Switch 106a and NIM 152b of Aggregation Switch 106b, and a second subset B of physical links between NIMs 152n of Aggregation Switch 106a and 106b. In an embodiment, the VFL links are connected between Switching ASICs 210 residing in the NIMs 152 of the Aggregation Switches 106. The NIMs 152 each also include a Queuing ASIC 212, described further below. A switching fabric integrated circuit (IC) 214 provides an interconnection between the various NIMs 152 in the Aggregation Switch 106.

A unique chassis identifier is assigned to each Aggregation Switch 106 in the multi-chassis system. The Chassis ID for each Aggregation Switch 106 is unique and global, e.g. each Aggregation Switch is aware of the chassis ID of its peer Aggregation Switch. Unique hardware device identifiers (MIDs) for various components, such as IC, NIM, CMM, in each Aggregation Switch are also generated allowing for management of local and remote objects. In an embodiment, the hardware device identifiers for the Switching ASICs 210 have global significance within the multi-chassis system while MIDs for other components, such as Queuing ASICs 212, may have only local significance. For example, the hardware device identifiers' assigned to the Switching ASICs 210 are known by both Aggregation Switches 106 while hardware device identifiers for other devices are restricted to a local Aggregation Switch and have no significance to the remote Aggregation Switch.

In an embodiment, the Switching ASICs 210 are assigned a global unique hardware device identifier (MID) in a range assigned to its Aggregation Switch, such as:

Aggregation Switch 106a: Chassis ID=1 and MID values 0-31

Aggregation Switch 106b: Chassis ID=2 and MID values 32-63

Exemplary MIDs assigned to Switching ASICs 210 are shown in FIG. 3. By knowing the assigned range, a module is able to determine the location of a switching ASIC from its MID as in Aggregation Switch 106a or Aggregation Switch 106b.

Figure 4:
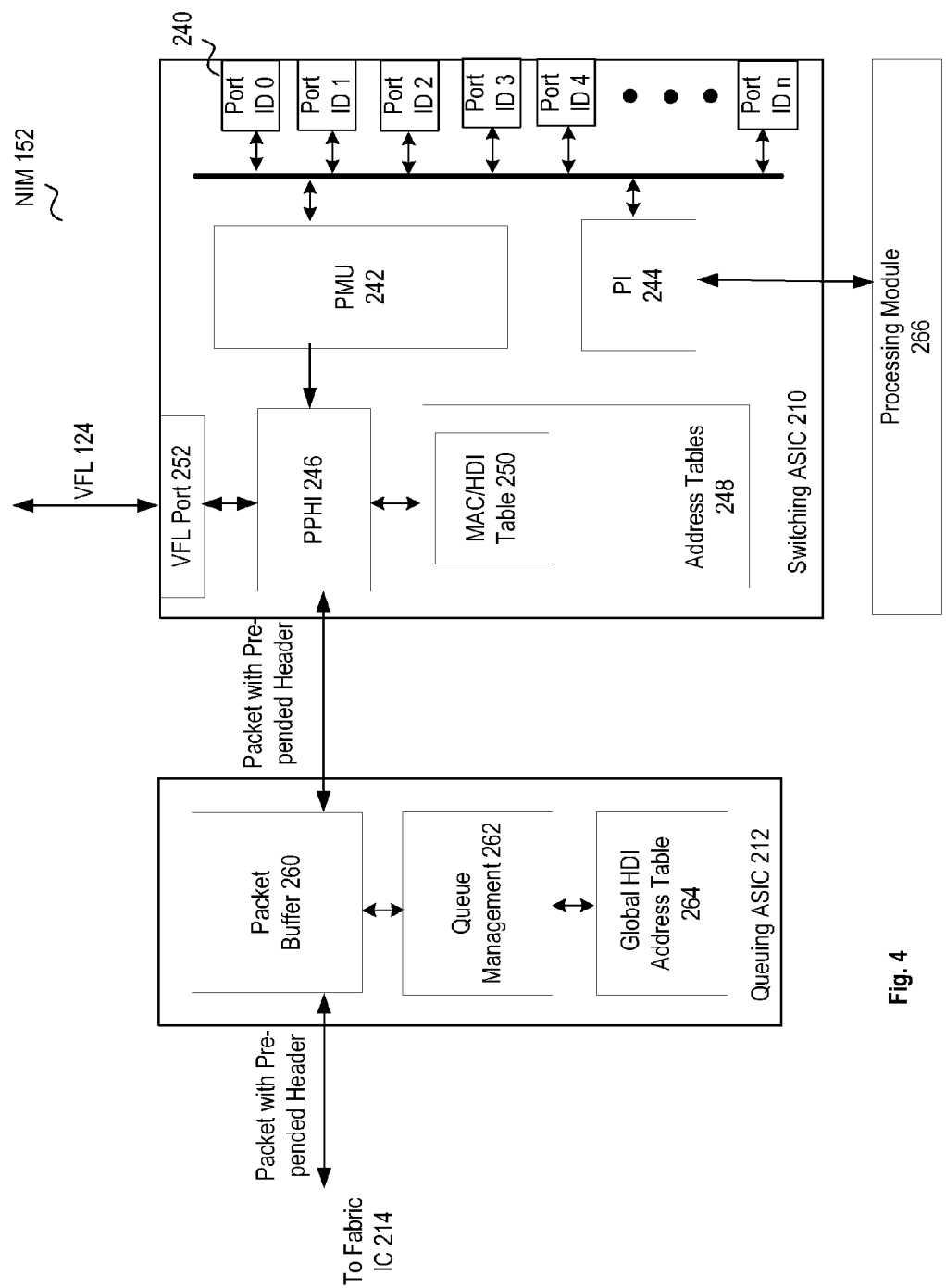
FIG. 4 illustrates a schematic block diagram of an embodiments of a network interface module of an aggregate switch in a multi-chassis domain in accordance with the present invention.

In an embodiment, the Switching ASICs 210 operates in a pre-pended header mode to exchange data and control packets between the Aggregation Switches 106. FIG. 4 illustrates a schematic block diagram of an embodiment of a network interface module (NIM) 152 in more detail. The Switching ASIC 210 includes a plurality of external port interfaces 240 that are connected to external nodes, such as edge nodes 104a and 104*b*. One or more of the external port interfaces 240 may include member ports for a MC-LAG physical link, LAG or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned an external port interface identifiers (Port ID), e.g., device port values, such as gport and dport values, associated with the Switching ASICs 210. In an embodiment, MIDs of the Switching ASICs 210 and an external port interface identifiers for external ports 240 on the Switching ASICs 210 are used to uniquely identify a physical external port interface 240 of a Switching ASIC 210 on either the local or remote Aggregation Switch in the multi-chassis system. In another embodiment, a Port Manger that includes a conversion module or other entity may convert the MIDs of the Switching ASICs 210 and external port identifiers into a single integer value, to generate a global port value (GPV), e.g. MID 4; device port identifier (dport) 5 converts to GPV 20. In either example, unique external port identifiers for the external ports of NIMs 152 in both the local and remote Aggregation Switches are generated. Unique port identifiers may also be assigned to internal ports of a Switching ASIC 210, such as an internal port from the Switching ASIC 210 to a processing module on the NIM 152. These internal ports are also uniquely identified by the port identifier and the MID of the Switching ASIC.

The Switching ASIC 210 further includes a packet management unit (PMU) 242 that determines a destination address of incoming packets. The packets may be switched to another external port interface 240 of the Switching ASIC 210, to the Queuing ASIC 212 for transmission to another NIM 152 on the local or remote aggregate switch, or to the processor interface (PI) 244 for transmission to a processing module 266 of the NIM 152 external or internal to the Switching ASIC 210.

When a packet is to be transmitted to another NIM 152 on the local or remote Aggregation Switch, in an embodiment, the Switching ASIC 210 transfers the packet to a pre-pended packet header interface (PPHI) that adds or otherwise modifies the packet header to include hardware device information (HDI). The HDI includes identifiers of hardware devices associated with the source and/or the destination of the packet. In an embodiment, the pre-pended header may include other information such as packet priority and load balance identifiers. To obtain destination HDI information, the PPHI performs a look-up process to MAC/HDI forwarding table 250. The MAC/HDI forwarding table 250 stored in the address table memory 248 includes a list of MAC address entries, such as MAC address for external devices, nodes, modules, software or hardware connected to the Aggregation Switch 106. The MAC address entries include associated hardware device information used in bridging or routing a packet to reach a device with the associated MAC address. The destination hardware device information includes, for example, the port identifier and MID of a Switching ASIC 210 (e.g. MID=24, port ID=5 or MID=54, device port=12), of either the local or peer Aggregation Switch, associated with the destination MAC address. In another embodiment, the destination hardware device information may include the global port value (GPV) of the external port interface associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the Queuing ASIC of the NIM 152 as well.

In an embodiment, when the Switching ASIC 210 includes an active VFL member port 252 with a link to the remote Aggregation Switch, the MAC/HDI forwarding table 250 may include additional HDI information, such as a table to associate gport values into Switching ASIC MID values and device port values and/or a table with logical aggregate group identifiers mapping to external port interfaces.

In an embodiment, the pre-pended header includes hardware device information HDI associated with the source port, such as an external or internal port interface, including hardware device identifier MID of the Switching ASIC and device port identifier of the source port).

In another embodiment, the pre-pended header includes HDI associated with a Switching ASIC 210 connected to the VFL port 124 (such as MID=0 or MID=31 for Aggregation Switch 106*a* in FIG. 3). The Switching ASIC 210 connected to the VFL port will then translate or convert the HDI in the pre-pended header before transmitting the packet over the VFL.

In an embodiment, the PPHI 246 also appends source hardware device information associated with the source port, e.g. the external port interface 240 that first received the packet. The source hardware device information may include the MID of the Switching ASIC 210 and the port identifier (e.g., device port) and/or global port value (GPV) of the external port interface 240. Additional information, such as destination hardware device identifier or MID, a destination device port, VLAN ID, packet type (multicast, unicast, broadcast), packet priority and load balance identifier is also added to the pre-pended header in an embodiment. In an embodiment, the destination HDI is retrieved from the address tables 248, such as MAC/HDI forwarding table 250.

The packet with the pre-pended header is then transmitted to the Queuing ASIC 212 for routing over the Fabric IC 214. The Queuing ASIC 212 includes a packet buffer 260, a queue management 262 for providing traffic and buffer management and a global HDI address table 264. The global HDI address table 264 maps the destination HDI to the appropriate queues in Queuing ASICs 212 in one or more of the other NIMs 152. For example, the mapping provides information for switching the packet into an appropriate egress queue for one or more of the external port interfaces in other Queuing/Switching ASICs in the Aggregation Switch 106 based on the hardware device information in the pre-pended header. In another example, when the destination HDI indicates a destination on the remote Aggregation Switch (i.e. the destination device identifier belongs to a remote/peer switch range), the Queuing ASIC 212 switches the packet to an appropriate egress queue for one or more of the VFL port interfaces in the local Aggregation Switch 106 for transmission to the remote Aggregation Switch over the VFL 124, e.g. the global HDI address table 264 indicates that the associated hardware device is located on the remote Aggregation Switch. In this scenario, the determination of the egress queue corresponding to a particular VFL port interface is made based on the load balance identifier present in the pre-pended header and inserted previously by the switching ASIC 210.

Though the switching ASIC 210 and Queuing ASIC 212 are illustrated as separate integrated circuits or modules, one or more functions or components of the ASICs may be included on the other ASIC or combined into an alternate ASIC or otherwise be implemented in one or more integrated circuits.

Figure 5:
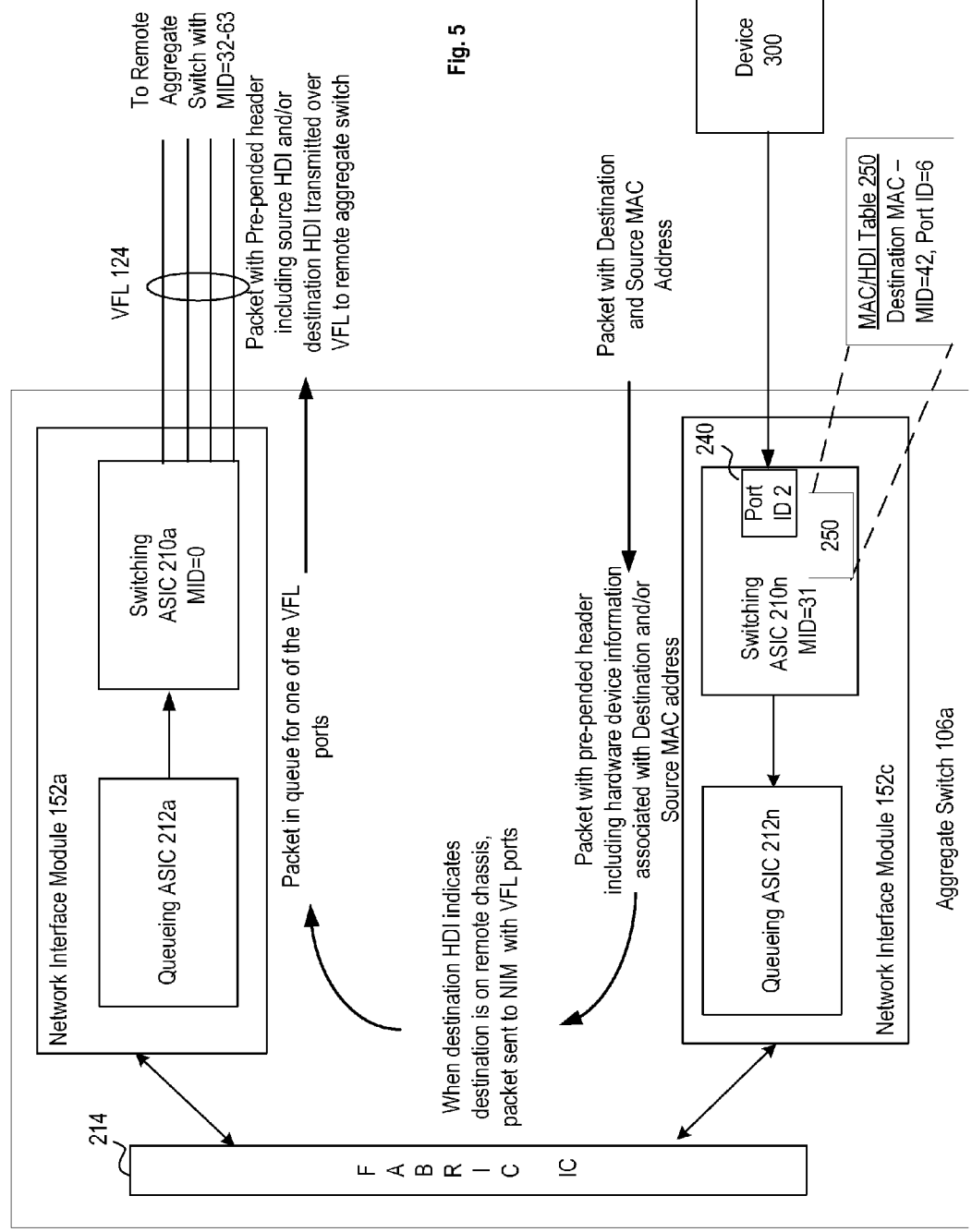
FIG. 5 illustrates a schematic block diagram of an embodiment of packet flow through an aggregate switch in a multi-chassis domain in accordance with the present invention.

FIG. 5 illustrates a schematic block diagram of an embodiment of a packet flow through Aggregation Switch 106*a* to VFL 124. In this example, a device 300 with source MAC address, such as enterprise device 110 or home network device 112, transmits a packet, e.g. through edge node 104, to Aggregation Switch 106*a* with a destination MAC address of a device that may be accessed over an external port interface of the remote Aggregation Switch 106*b*. Switching ASIC 210*n*, e.g. with MID=31 in FIG. 5, in NIM 152*n* receives the packet on an external port interface 240, e.g. with port ID=2. The Switching ASIC 210*n* extracts a destination MAC address and performs an address table look-up to determine hardware device information (HDI) associated with the destination MAC address from MAC/HDI forwarding table 250. The destination HDI may include, e.g., device module identifiers (MIDs) of one or more hardware components in a path to the destination device with the MAC address, such as NIMs 152, Queuing ASICs 212, Switching ASICS 210, external port identifiers 240, member ports of the VFL 124, of either the local Aggregation Switch 106*a* or remote Aggregation Switch 106*b*. In an embodiment, the destination HDI may include the MID of the Switching ASIC 210 and port identifier (e.g., device port) of the external port interface 240 that provides access to the destination device. Furthermore, in an embodiment, the pre-pended header includes a packet priority and a load balance identifier determined based on parameters retrieved from the original packet (source MAC address, destination MAC address, source IP address, destination IP address). In another example, the HDI would include a global port value (GPV) for the external port interface 240 or MID of the NIM 152 that provides access to the destination device. In another embodiment, when the destination MAC address is associated with the remote Aggregation Switch, the HDI may include the hardware device identifier MID for the NIM 152*a* or Switching ASIC 210 (such as MID=0) connected to the VFL 124. The destination HDI is added to a pre-pended header that adds information to the original packet header (such as a layer 2, Ethernet packet header type). The Switching ASIC 210*n* also includes source hardware device information (HDI) for one or more devices associated with the originating external port interface, e.g. port ID=2. The source HDI may include one or more hardware device identifiers, such as MID of the originating Switching ASIC 210, source port identifier (e.g. device port), global port value, MID for source NIM 152, Chassis ID, etc.

The packet with pre-pended header is transmitted to the Queuing ASIC 212*n* which then determines a NIM 152 on the local Aggregation Switch to transmit the packet based on the destination HDI. When the destination HDI indicates a local external port interface on the Aggregation Switch 106*a* (e.g. based on the destination MID contained in the pre-pended header), the Queuing ASIC 212*n* places the packet in an egress queue for transmission to the corresponding NIM 152 of the local external port interface. In another example illustrated in FIG. 5, the Queuing ASIC 212*n* determines that the destination HDI indicates a destination hardware device on the remote Aggregation Switch, e.g. the HDI indicates Switching ASIC with MID=45 on the remote Aggregation Switch. To reach the remote Aggregation Switch, the packet needs to be transmitted over the VFL 124. So the Queuing ASIC 212*n* transmits the packet with pre-pended header from a queue over the Fabric IC 214 to NIM 152*a* connected to the VFL 124. The selection of a VFL member port is made based on the load balance identifier parameters carried on the pre-pended header. The Queuing ASIC 212*a* on NIM 152*a* receives the packet with pre-pended header and queues the packet for transmission over the VFL 124. The Switching ASIC 210*a* then transmits the packet with pre-pended header including the source and/or destination HDI to the remote Aggregation Switch over the VFL 124.

In an embodiment, the Switching ASIC 210*a* may alter the pre-pended header prior to transmission over the VFL 124. For example, the Switching ASCI 210*a* may translate a destination HDI with local significance (e.g., a gport value or local hardware device identifier MID) to an HDI with global significance. The Switching ASIC 210*a* then transmits the packet with pre-pended header including the source and/or destination HDI to the remote Aggregation Switch over the VFL 124.

In an embodiment, when multiple Switching ASICs 210 of an Aggregation Switch 106 are connected to the VFL 124, e.g. in FIG. 3, Switching ASICs MID=0 and MID=31, the traffic to be transmitted over the VFL 124 may be distributed. For example, a load balance identifier map table in the Global HDI Address Table 264 of the Queueing ASIC 212 would indicate the following distribution:

| Destination MID | Outgoing Port | MID's Device Location |
|---|---|---|
| [0-31] | VFL 124 | Local |
| [32-63] | VFL 124 | Remote |

The Queueing ASICs 212 map the packets to the appropriate VFL port interface using the load balance identifiers or other load balancing techniques. For example, in an embodiment with 8 NIMs 152 on each Aggregation Switch, each Queuing ASIC 212*n* has a set of 8 queues configured to each NIM (Module ID, Port) within the local Aggregation Switch. In an embodiment, the Queuing ASICs 212 connected to the Switching ASICs 210 with the VFL 124 have a separate set of 8 queues related to each VFL member port interface. Each of those queues is assigned to the FIFOs associated with the internal VFL ports connecting the multi-chassis switches. In an embodiment, with multiple Virtual Fabric Link member ports, the queues are assigned such that the destination ports on the remote chassis are equally distributed among the Queuing ASICs 212*a* and 212*n* that host the Virtual Fabric Link Member Ports.

In an embodiment, the MAC/HDI forwarding tables in the NIMs 152 are populated and then updated in response to layer 2 packets flow through the system. Since the pre-pended header includes source MAC address and source HDI information, the NIMS 152, e.g. in specific the Switching ASICs 210 in an embodiment, are able to populate the MAC/HDI forwarding table 250 with this information. By operating in a pre-pended header mode to exchange Layer 2 packets with source MAC addresses and source HDI over the VFL 124, the Switching ASICs 210 are able to synchronize MAC address tables between the Aggregation Switches 106. Though the MAC/HDI forwarding table is described in the Switching ASICs 210, the MAC/HDI forwarding table may be included, alternatively or in addition to, in the Queuing ASICs 212*n* or other module of the NIM 152. In another embodiment, the CMM 150 (primary and secondary) may also include a MAC/HDI forwarding table for one or more types of links between the Aggregation Switches 106.

Figure 6:
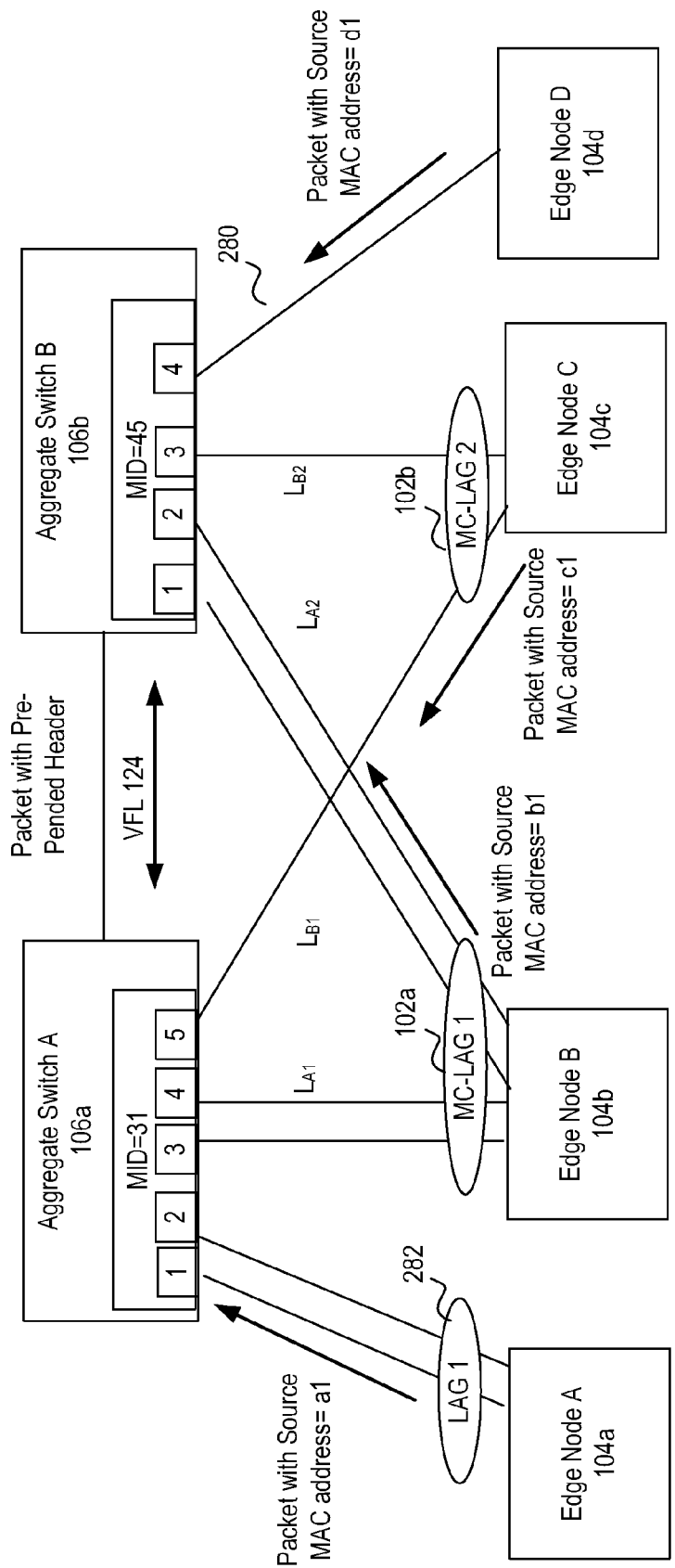
FIG. 6 illustrates a schematic block diagram of an embodiment of source address learning in a multi-chassis domain in accordance with the present invention.

FIG. 6 illustrates a schematic block diagram of an embodiment of a multi-chassis system that illustrates source MAC learning. Edge nodes 104 are connected to Aggregation Switches 106*a* and 106*b* over logical aggregate group LAG1 282, multi-chassis logical aggregate group MC-LAG1 102*a*, multi-chassis logical aggregate group MC-LAG2 102*b* and fixed port link 280. In an embodiment, each Aggregation Switch communicates to the other Aggregation Switch configuration information for logical aggregate groups, such as LAG1 and other types of trunk groups, and hardware device information associated thereto. In an embodiment, the hardware device information includes physical ports associated with the logical aggregate groups, e.g. hardware device or module identifiers (MID) of Switching ASICS and external port identifiers for links associated with the logical aggregate groups (device port values or gport values).

For example, in an embodiment, Aggregation Switch A notifies Aggregation Switch B that the logical aggregate group with aggregate group identifier LAG1 is associated with a Switching ASIC having a hardware device module identifier MID=31 and external port interface with identifier device port=1, 2. Aggregation Switch B notifies Aggregation Switch A that the logical aggregate group with aggregate group identifier MC-LAG1 is associated with a Switching ASIC having hardware device module identifier MID=45 and external port interface identifier device port=1, 2. Other hardware device information, such as identifiers of NIMs, Queuing ASICs, etc. associated with the logical aggregate groups may be exchanged alternatively or in addition to the Switching ASIC's MIDs and device port values. The Aggregation Switches 106 also provide notifications of updates to the configuration of the logical aggregate groups for both ordinary aggregates and multi-chassis aggregate groups. The hardware device information associated with the logical aggregate groups and multi-chassis aggregates of either of the Aggregation Switches is included in one or more of the MAC/HDI forwarding tables in NIMs 152 on both Aggregation Switches. For example, in an embodiment, one or more of the MAC/HDI forwarding tables in both Aggregation Switches 106 includes the following information:

| Type of Aggregate Group | Aggregate Group Identifier | HDI List of VFL Member Ports |
|---|---|---|
| LAG | LAG1 | (MID = 31, Port ID = 1) |
|  |  | (MID = 31, Port ID = 2) |
| MC-LAG | MC-LAG1 | (MID = 31, Port ID = 3) |
|  |  | (MID = 31, Port ID = 4) |
|  |  | (MID = 45, Port ID = 1) |
|  |  | (MID = 45, Port ID = 2) |
| MC-LAG | MC-LAG2 | (MID = 31, Port ID = 5) |
|  |  | (MID = 45, Port ID = 3) |

Since the same aggregate group identifiers for logical aggregate groups (e.g. LAG1) are known and utilized by both Aggregation Switches 106, in an embodiment, the multi-chassis system assigns a subset of aggregate group identifiers to each type of logical group and for each of the Aggregation Switches 106. For example, in an embodiment with a maximum of 128 possible aggregate groups, an assignment of aggregate group identifiers would include:

| Type of Aggregate Group | Aggregation Switch | Range Configuration | Range Default | Example |
|---|---|---|---|---|
| LAG | chassis 1 | MIN_LAG_ID_LOCAL MAX_LAG_ID_LOCAL | [0-47] | [0-100] |
| LAG | chassis 2 | MIN_LAG_ID_REMOTE MAX_LAG_ID_REMOTE | [48-95] | [101-120] |
| MC-LAG | Both chassis | MIN_MC-LAG_ID MAX_MC-LAG_ID | [96-127] | [121-127] |

The Aggregation Switches 106 assign aggregate group identifiers based on the assigned ranges and type of aggregate group. As such, packet forwarding in the Aggregation Switches is performed by accessing the MAC/HDI forwarding tables and using the mapping between the logical aggregate groups and hardware device information. Typically, aggregate identifier information is not transferred in the pre-pended headers.

In an embodiment, to facilitate load balancing over a LAG or MC-LAG, when an Aggregation Switch 106 receives a packet over the VFL 124 with destination HDI information, such as (MID, Port ID), the Aggregation Switch 106 determines whether the destination HDI is included in a logical aggregate group by searching for the port identified in the source HDI (destination MID, destination Port identifier) in one or more of its internal trunk tables that contain a list of all ports that are active members of each LAG or MC-LAG aggregate group. When a destination port is found in an associated LAG or MC-LAG, the Aggregation Switch 106 may perform load balancing techniques by assigning the packet to one or more different external port interfaces of the associated LAG. For example, when Switching ASIC 210 connected to the VFL in the remote Aggregation Switch 106b receives a packet with destination HDI of MID=45, port 2, the switching ASIC 210 determines from its MAC/HDI table below, that MID=45, port 2 is part of MC-LAG1 as shown in the example in FIG. 6. The switching ASIC may then decide to perform load balancing and determine through one or more hash algorithms to transmit the packet over MID=45, port 1 of MC-LAG1 instead. In this particular example, the switching ASIC will then strip off the pre-pended header prior to transmitting the packet out of the external port (MID=45, port 1).

| Aggregation Switch A | |
|---|---|
| LAG ID | HDI |
| LAG1 | (MID = 31, Port ID = 1) |
|  | (MID = 31, Port ID = 2) |
| MC-LAG1 | (MID = 31, Port ID = 3) |
|  | (MID = 31, Port ID = 4) |
|  | (MID = 45, Port ID = 1) |
|  | (MID = 45, Port ID = 2) |
| MC-LAG-2 | (MID = 31, Port ID = 5) |
|  | (MID = 45, Port ID = 3) |

Referring back to FIG. 6, various embodiments of methods and implementations therefore are now described for learning source MAC addresses and associated hardware device information (HDI) in a multi-chassis system. First, in an embodiment, for unknown unicast packets ingressing on a configured fixed port of one of the Aggregation Switches (e.g. traffic originating on fixed port 280 with source MAC address=d1), the Source MAC address is populated in MAC/HDI forwarding tables on both Aggregation Switches 106a and 106b as associated with hardware device information (HDI) of the originating configured fixed port (such as MID of Switching ASIC and source port identifier value or gport value of the source port, NIM identifier, or other hardware device ID associated with the source port). As such, in an embodiment, the source MAC address d1 is stored in one or more MAC/HDI forwarding tables of both Aggregation Switch A and Aggregation Switch B with the VLAN ID and HDI associated with the source port, e.g., MID=45, Port ID=4.

Next, in an embodiment, unknown unicast traffic ingressing on a logical aggregate group connected to only one of the Aggregation Switches 106, such as a trunk group or other type of LAG (e.g. traffic originating on LAG1 with source MAC address=a1), the Source MAC address is populated in MAC/HDI forwarding tables on both Aggregation Switches 106a and 106b as associated with the originating logical aggregate group identifier (e.g., LAG1). As such, in an embodiment, the source MAC address a1 received on LAG1 by Aggregation Switch A is stored in one or more MAC/HDI forwarding tables of both the Aggregation Switches 106 with the VLAN ID and logical aggregate group identifier LAG1. In addition, as explained herein, the MAC/HDI forwarding tables of both Aggregation Switches store the hardware device information associated with logical aggregate groups (learned through distribution of configuration information by the CMM 150 module or other control plane process). The MAC/HDI forwarding tables thus include information that MAC address a1 is associated with trunk group identifier LAG1 and HDI information associated with LAG 1.

Further, in an embodiment, for unknown unicast traffic ingressing on a MC-LAG member port (e.g. traffic originating on MC-LAG1 or MC-LAG2) of either Aggregation Switch 106, the Source MAC is populated in MAC/HDI forwarding tables as associated with the MC-LAG identifier and HDI information of the local member ports of the MC-LAG. The HDI information of the member ports of the MC-LAG will be the same for the MAC/LAG tables on each Aggregation Switch 106. In other words, both Aggregation Switches are fully aware of the entire list of member ports that are active participants of an MC-LAG aggregate group regardless of whether a member port is local or remote.

By associating member ports of a MC-LAG with a source MAC address, traffic destined to the MAC address through one of the edge nodes 104 is forwarded preferably via the MC-LAG member ports through the shortest path. This path reduces the amount of traffic crossing the VFL 124. In addition, it reduces MAC movement problems in some specific scenarios wherein traffic to and from an edge node 104 takes different paths over the MC-LAG for distinct flows. In the example of FIG. 6 in an embodiment, one or more of the MAC/HDI forwarding tables on the Aggregation Switches 106 includes the following information:

| Aggregation Switch A | | |
|---|---|---|
| MAC | LAG | LAG ID |
| a1 | Yes | LAG1 |
| b1 | Yes | MC-LAG1 |
| c1 | Yes | MC-LAG-2 |
| d1 | No | — |

| Aggregation Switch B | | |
|---|---|---|
| MAC | LAG | LAG ID |
| a1 | Yes | LAG1 |
| b1 | Yes | MC-LAG1 |

| Aggregation Switch B | | |
|---|---|---|
| MAC | LAG | LAG ID |
| c1 | Yes | MC-LAG-2 |
| d1 | No | — |

In another embodiment, MAC address tables displayed in a node or network management application may not include the HDI for the logical aggregation groups. The user displayed MAC address table may only include HDI for fixed ports and thus are similar for both Aggregation Switches 106.

| Aggregation Switch A | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

| Aggregation Switch B | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

The MAC/HDI forwarding tables are synchronized with respect to the LAG identifiers associated with the source MAC addresses. In addition, VLAN IDs associated with the MAC addresses may also be configured and synchronized on both Aggregation Switches. As such, logically, the Aggregation Switches 106 operate as a single bridge for MAC learning. Furthermore, MAC learning occurs automatically as traffic flows over the VFL 124 with minimum Layer 2/control module management software intervention and without the need for inter-process communication message-based MAC table synchronization.

Figure 7:
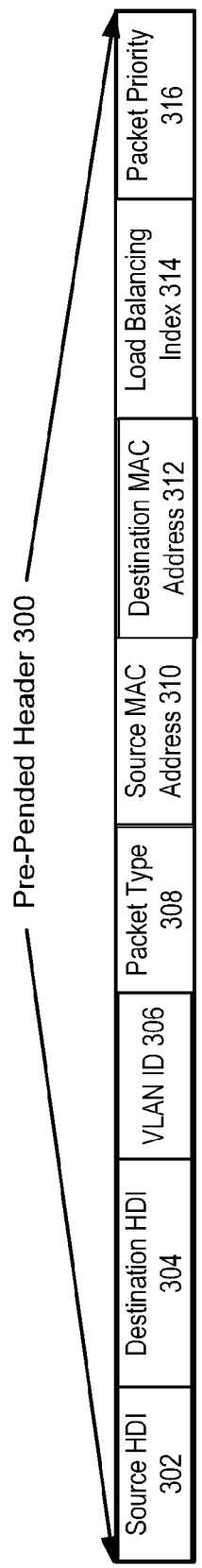
FIG. 7 illustrates a schematic block diagram of an embodiment of a pre-pended header of a packet in the multi-chassis domain in accordance with the present invention.

FIG. 7 illustrates a schematic block diagram of an embodiment of a pre-pended header of a packet in the multi-chassis system. The pre-pended header 300 includes fields for source HDI 302, destination HDI 304, VLAN ID 306, packet type 308, source MAC address 310, destination MAC address 312. In an embodiment, the pre-pended header may also include, load balance identifier 314 and packet priority 316. The destination HDI 304 includes, for example, the port identifier and MID of a Switching ASIC 210 (e.g. MID=24, port ID=5 or MID=54, device port=12), of either the local or peer Aggregation Switch, associated with the destination MAC address. In another embodiment, the destination hardware device information may include the global port value (GPV) of the external port interface associated the destination MAC address. The destination hardware device information may also include MID of the Switching ASIC 210 connected to the VFL, NIMs 152, Queuing ASICs, etc. The source HDI 302 may include the MID of the Switching ASIC 210 and the port identifier (e.g., device port) and/or global port value (GPV) of the external port interface 240. The load balance identifier 314 is used to help the Queueing ASIC 212 to decide which VFL member port to be used as a transit/gateway port to reach the peer Aggregate Switch. The packet priority 316 is used by the Queueing ASIC 212 to determine the specific priority queue.

Figure 8:
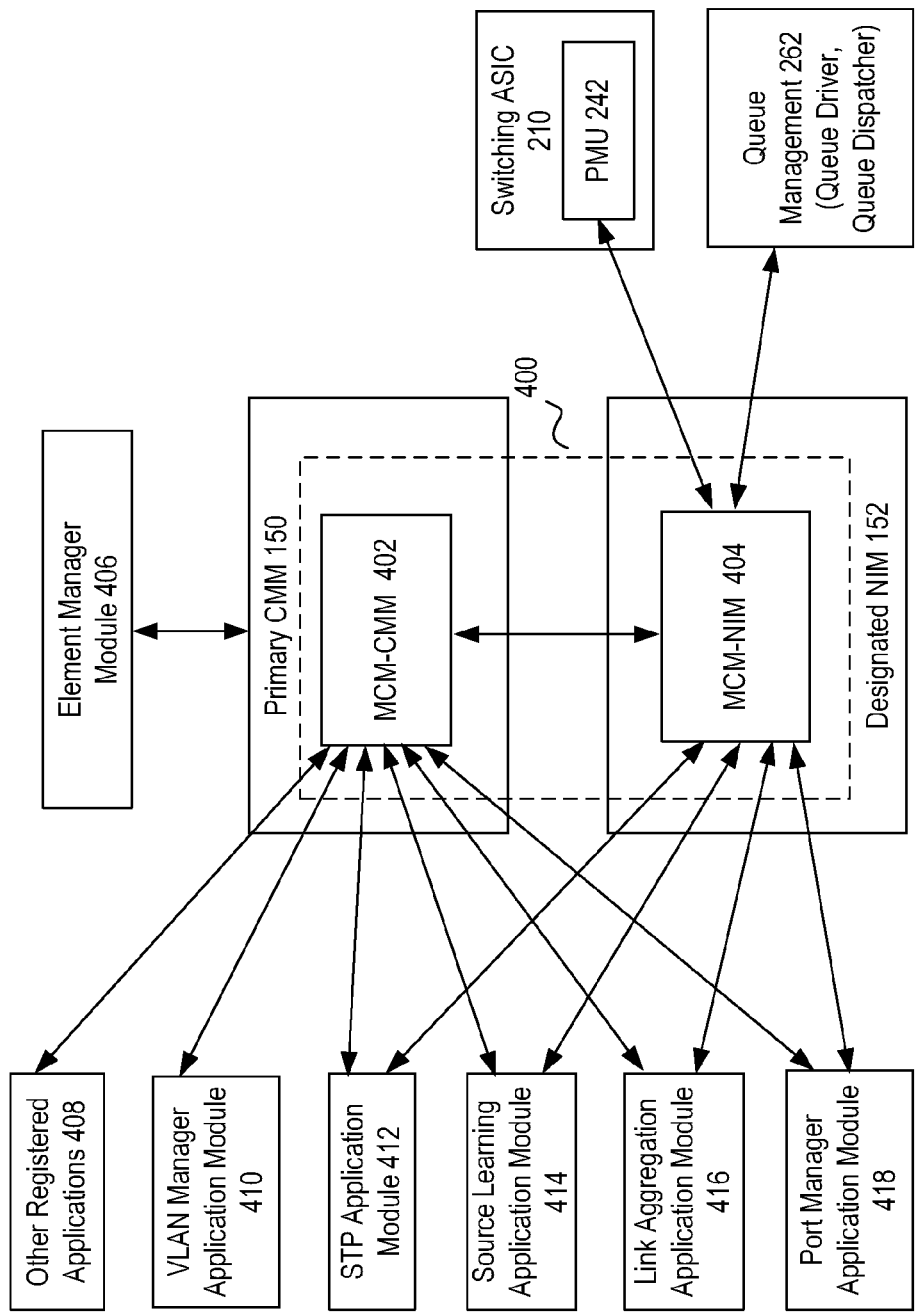
FIG. 8 illustrates a schematic block diagram of an embodiment of a multi-chassis management application in accordance with the present invention.

FIG. 8 illustrates a schematic block diagram of an embodiment of a multi-chassis management (MCM) application 400 operable in an Aggregation Switch 106 in a multi-chassis system 140. In an embodiment, the multi-chassis management application 400 includes a distribution of functionality between a central management module (CMM) 150 of the Aggregation Switch 106 and a processing module 266 in a designated network interface module (NIM) 152 of the Aggregation Switch 106. An example of a distribution of functionality of the multi-chassis management (MCM) application 400 is shown in the following table:

| MCM-CMM 402 | MCM-NIM 404 |
|---|---|
| Element and network management interface to the multi-chassis functionality Service interfaces with other software components, i.e. interfaces used by the MCM application 400 to provide or request services to/from other software components. | Multi-chassis control protocol state machines Service interfaces with other software components, i.e. interfaces used by the MCM application 400 to provide or request services to/from other software components. Programming of the underlying Switching ASIC devices: global module identifiers (MID), loop prevention, multi-chassis inter-process communication infrastructure, VFL member port programming, etc. |

In an embodiment, the MCM-CMM 402 includes an interface between the MCM application 400 and element and/or network manager module 406 as well as an interface to other applications 408 registered with MCM 400 operable on the Aggregation Switch 106. The MCM Application 400 informs the registered applications 408 when to operate in the multi-chassis mode. More generally, the MCM application 400 provides a wide range of notifications to inform interested applications about the status of the multi-chassis system both in the context of the local switch and peer switch. Some of the status information is driven by management configuration on either switch, whereas other status information is triggered by runtime decision taken by each switch individually or by all the switches within the multi-chassis system upon control data exchange, negotiation and agreement. The MCM Application 400 also interfaces with the VLAN Manager Application module 410, Spanning Tree Protocol (STP) application module 412, Source Learning application module 414, Link Aggregation application module 416 and Port Manager application module 418 for the purposes of requesting services from these system components. For example, the MCM Application may request VLAN Manager to configure one VFL member port as a member of the multi-chassis control VLAN in order to allow the set up of an inter-process communication channel between the multi-chassis peer switches.

The MCM-CMM 402 also selects a designated NIM 152 to perform MCM-NIM functions related to the multi-chassis protocol. The multi-chassis protocol allows the multi-chassis peer switches to discover each other, elect a master switch, exchange system information and perform periodic health checks. Use of the designated NIM 152 avoids centralizing the functions of the MCM application 400 only at the CMM 150. In addition, the MCM-CMM 402 selects a back-up designated NIM 152 in case of failure in the primary designated NIM 152. For example, the designated NIMs may be selected based on the lowest operational slot number.

The MCM-NIM 404 operating in each NIM 152 performs global module identification configuration (e.g. MID). When the Aggregation Switch chassis identification information is available, the MCM-NIM 404 derives and initializes the hardware device identifiers to the switching ASICs 210. For example, when the Aggregation Switch chassis identification is equal to 1, the MCM-NIM 404 assigns hardware device identifiers MIDs in the range 0-31 to Switching ASICs 210 in the Aggregation Switch 106 and when the Aggregation Switch chassis identification is equal to 2, the MCM-NIM 404 assigns MIDs in the range 32-63 to Switching ASICs 210 in the Aggregation Switch 106. A chassis identifier equal to zero is reserved for stand-alone operation, i.e. no multi-chassis functionality active in the system.

The MCM-NIM 404 also interfaces with the queue management 262 in Queuing ASICs 212 to perform hardware device/queue mapping functions and inter-chassis loop avoidance functions. The MCM-NIM 404 also includes multi-chassis state functionality for the control and management of the Virtual Fabric Link (VFL) 124. Virtual Fabric Link Control manages and configures the VFL 124 and interfaces with the port manager application module 418 to monitor and/or control the state of the VFL 124 and its member ports. It also tracks and updates the status of the VFL 124. The MCM-NIM 404 tracks the state of each VFL member port using the standard LACP protocol, or other similar protocol, along with the state of the link at the physical level. In addition to the LACP protocol, a multi-chassis status protocol performs periodic keep-alive checks (hello protocol) in order to check the status and/or operability of components running on the designated NIM on both multi-chassis switches. All multi-chassis protocol packets must be assigned a high priority in the system to avoid false/premature failure detection because such a premature detection of failure may have a very disruptive effect in the system. By running the multi-chassis status protocol on a primary designated NIM 152, the back-up designated NIM module is able to assume control of the status protocol processing in the event of failure.

The MCM-CMM 402 and the MCM-NIM 404 register with port manager application module 418 to receive port state and link state events about the member ports and links of the VFL 124. In another embodiment, the MCM 400 may include a port manager application module to monitor the port and link state of the VFL 124. The MCM 400 tracks the operational state of VFL 124 and processes events about the VFL status, i.e. aggregate created/deleted/up/down. The port manager application module 418 provides link state notifications to both the MCM-CMM 402 and MCM-CMM 404.

In an embodiment, a transport control protocol between Aggregation Switches in a multi-chassis system is implemented to transport control protocol packets between designated NIMs 152 of Aggregation Switches 106. The transport control protocol is operable in switches having different platforms using distinct types of hardware (e.g. switching ASICs with minimal or no prior communication or exchange of parameters of explicit configuration between the aggregate switches. In an embodiment, each aggregate switch 106 is a fully distributed system with multiple NIMs 152 and controller boards, each running application components independently. On each aggregate switch 106, there is a designated NIM 152 with a designated processing module 266 that operates the transport control protocol, e.g. as part of the MCM-NIM 404. The designated NIM 152 for the aggregate switch 106 may host the VFL 124 or may be a different NIM 152 than the one that hosts the VFL 124. In addition, a back-up designated NIM 152 for each Aggregation Switch 106 is defined in case of failure of the primary designated NIM 152.

Figure 9:
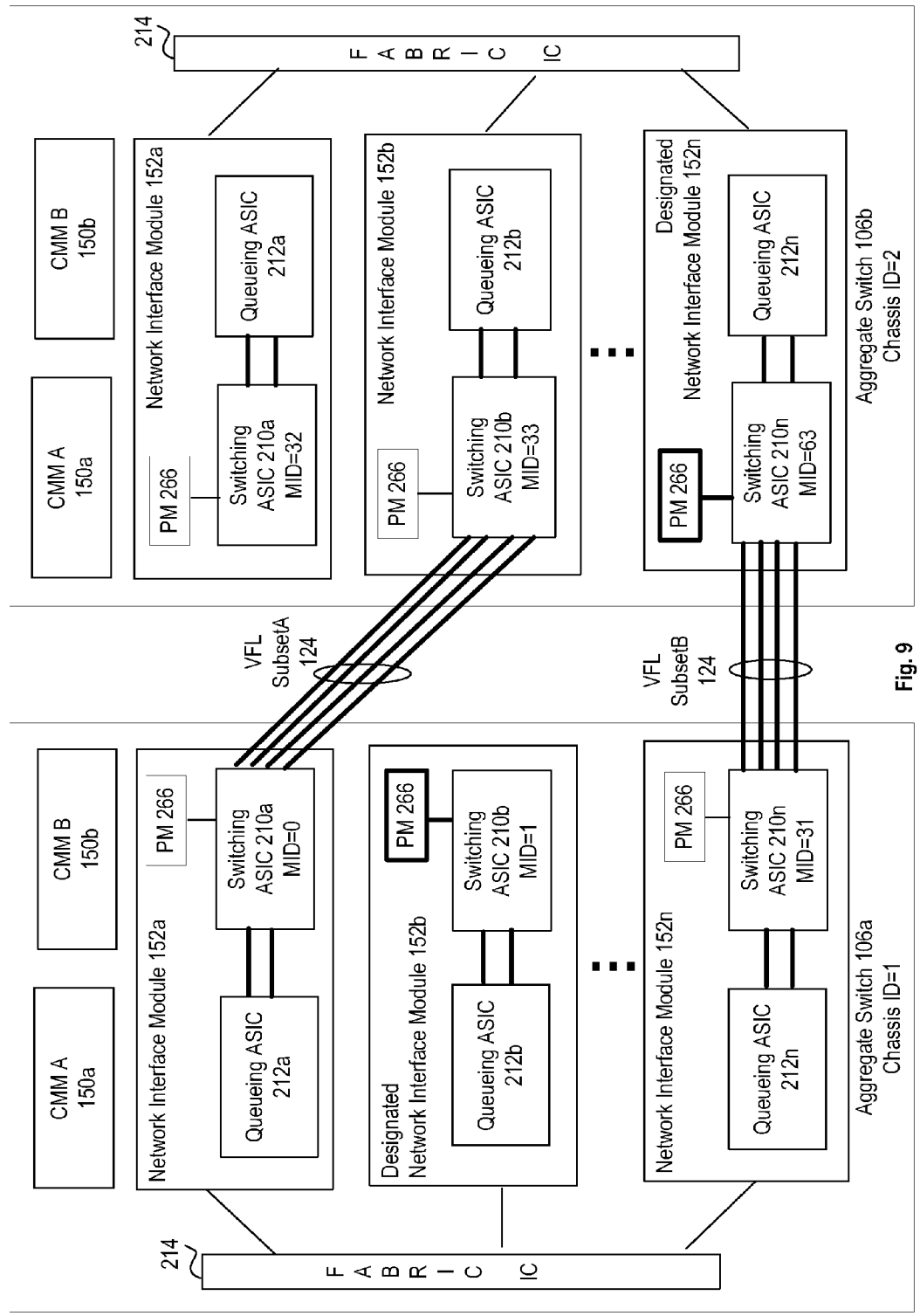
FIG. 9 illustrates a schematic block diagram of an embodiment of a transport control protocol operating in a multi-chassis domain in accordance with the present invention.

FIG. 9 illustrates an embodiment of the transport control protocol operating in Aggregation Switches 106a and 106b in a multi-chassis system 140. In an embodiment, the transport control protocol operating on the primary designated NIM 152 (e.g. as part of the MCM-NIM 404) reserves a dedicated transport virtual local area network (VLAN) for use as the multi-chassis system control channel. A default VLAN ID is defined on each Aggregation Switch (e.g. VLAN ID=4094) as the dedicated transport VLAN. The default VLAN ID may be configurable for flexibility. In an embodiment, the NIMs 152 in each Aggregation Switch generate and receive protocol packets while CMMs 150 generally do not generate the control protocol packets. However, in other embodiments the CMM 150 or other modules may be configured with the transport control protocol to generate and receive protocol packets. In addition, in an embodiment, only the designated processing module (PM) 266 of the primary designated NIMs 152 of each Aggregation Switch generates protocol packets destined to the other Aggregation Switch, and only the designated PM 266 of the primary designated NIM 152 receives protocol packets originated from other NIMs 152 on its local Aggregation Switch.

The transport control protocol also generates a Layer 2 multicast group (such as a multicast MAC address group) for a subset of ports in the designated VLAN. The reserved multicast group is assigned the desired physical ports within each Aggregation Switch 106 to receive the protocol packets. For example, the multicast group may be assigned a layer 2 MAC multicast address (e.g. 01:20:da:00:ff:03). Protocol packets exchanged by the Aggregation Switches 106 include this layer 2 multicast address as the destination address, e.g. in the pre-pended header. Protocol packets flow between the Aggregation Switches 106 based on membership to the multicast group. For example, specific or designated ports (e.g. physical ports) are added or removed to/from this multicast group to control the destination of the protocol packets.

FIG. 9 illustrates an example of the specific or designated ports that are included in the multicast group. The bold lines indicate the physical links/ports that are members of the multicast group. For example, the multicast group includes the internal ports between the Queuing ASICs 212 and Switching ASICs 210 of a plurality of NIMs 152 in each Aggregation Switch 106 and the member ports of VFL 124. However, only ports of the processing modules (PM) 266 of the designated NIMs 152 in each Aggregation Switch are included in the multicast group such that the protocol packets only reach the designated processing modules 266 on the designated NIMs 152. The membership of the multicast group can be dynamically changed from the processing module 266 in the primary designated NIM to the processing module in the back-up designated NIM 152 of an Aggregation Switch 106 in response to software or hardware failures. In addition, the VFL member ports are added or removed from the multicast group as needed in a dynamic fashion.

Figure 10:
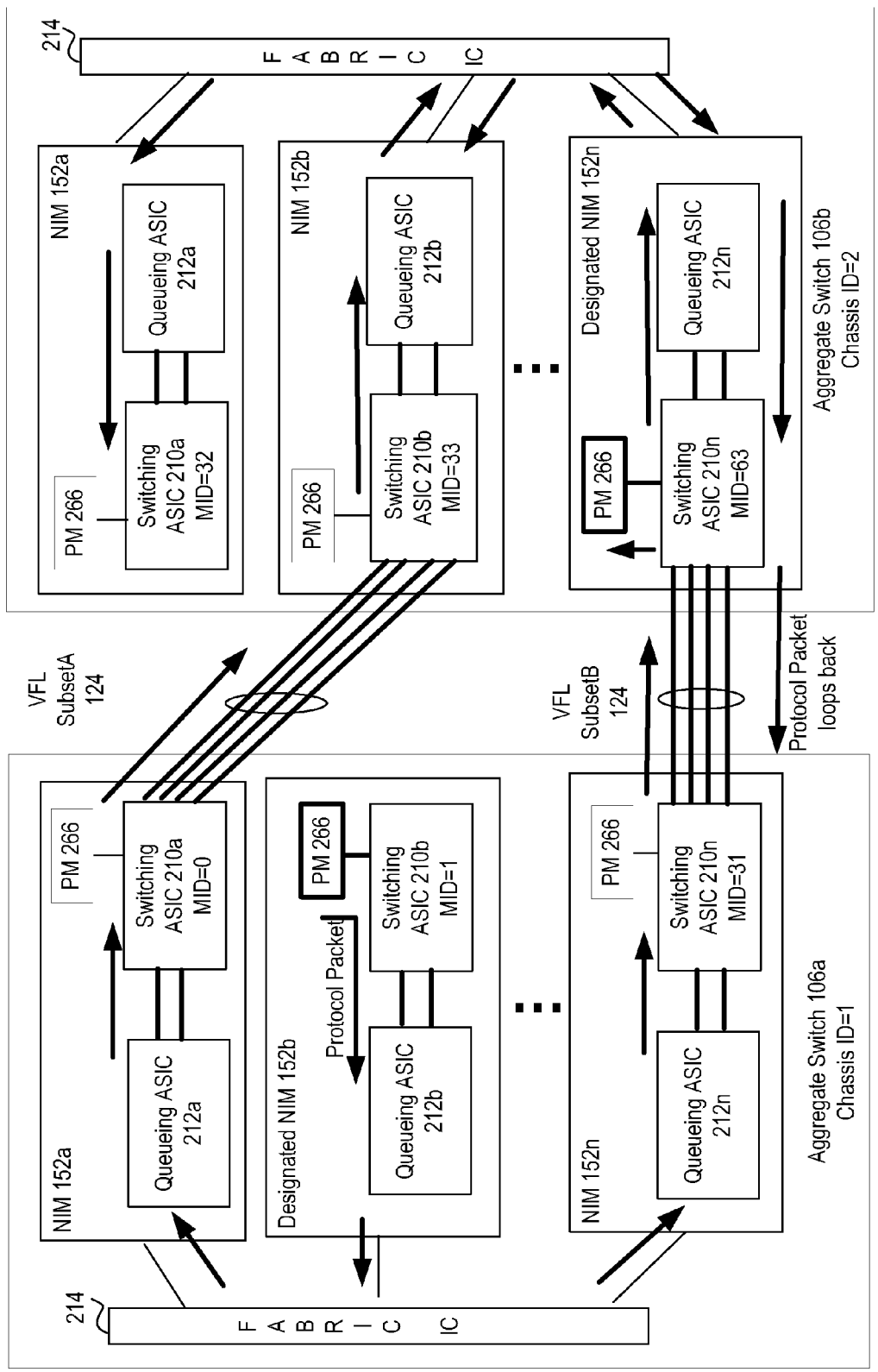
FIG. 10 illustrates a schematic block diagram of another embodiment of a transport control protocol operating in a multi-chassis domain in accordance with the present invention.

FIG. 10 illustrates a schematic block diagram of an embodiment of protocol packet flow using the transport control protocol. A protocol packet is generated by processing module (PM) 266 operating in accordance with the transport control protocol in designated NIM 152*b* in Aggregation Switch 106*a*. The protocol packet includes a pre-pended header that includes a destination address of the multicast group described with respect to FIG. 9 as a destination address. The protocol packet includes a source MAC address corresponding to the MAC address of the originating Aggregation Switch. In addition, the pre-pended header of the protocol packet includes source hardware device information for the originating PM 266, e.g. the port identifier for the port connecting the PM 266 to the switching ASIC 210. The source hardware device information also includes the originating Switching ASIC hardware device information as well, such as MID=1 of Switching ASIC 210*b*. The protocol packet also includes the VLAN ID for the transport VLAN and a packet type indicator that the protocol packet is a multicast packet.

The protocol packet flows from the originating PM 266 in the designated NIM 152 to member ports of the destination multicast group. For example, as shown in FIG. 10, the protocol packet flows from PM 266 in designated NIM 152*b* to the internal ports between the Queueing ASICs 212 and Switching ASICs 210 of a plurality of NIMs 152 in the Aggregation Switch 106*a*. However, the PM 266 in NIM 152*a* and 152*n* do not receive the protocol packet because only the port of the designated PM 266 in NIM 152*b* is included in the multicast group. The protocol packet is also transmitted to the member ports of VFL 124 and to the Aggregation Switch 106*b*. The protocol packet is then transmitted to the internal ports between the Queueing ASICs 212 and Switching ASICs 210 of the plurality of NIMs 152 in the Aggregation Switch 106*b*. However, only the PM 266 of the designated NIM 152*n* in Aggregation Switch 106*b* is a member of the multicast group and receives the protocol packet. The other PMs 266 in NIM 152*a* and NIM 152*b* do not receive the protocol packet. As such, only the designated PM 266 (and not the other PMs 266) in the Aggregation Switch 106*b* receives the protocol packet originated from the designated PM 266 in the Aggregation Switch 106*a*.

Figure 11:
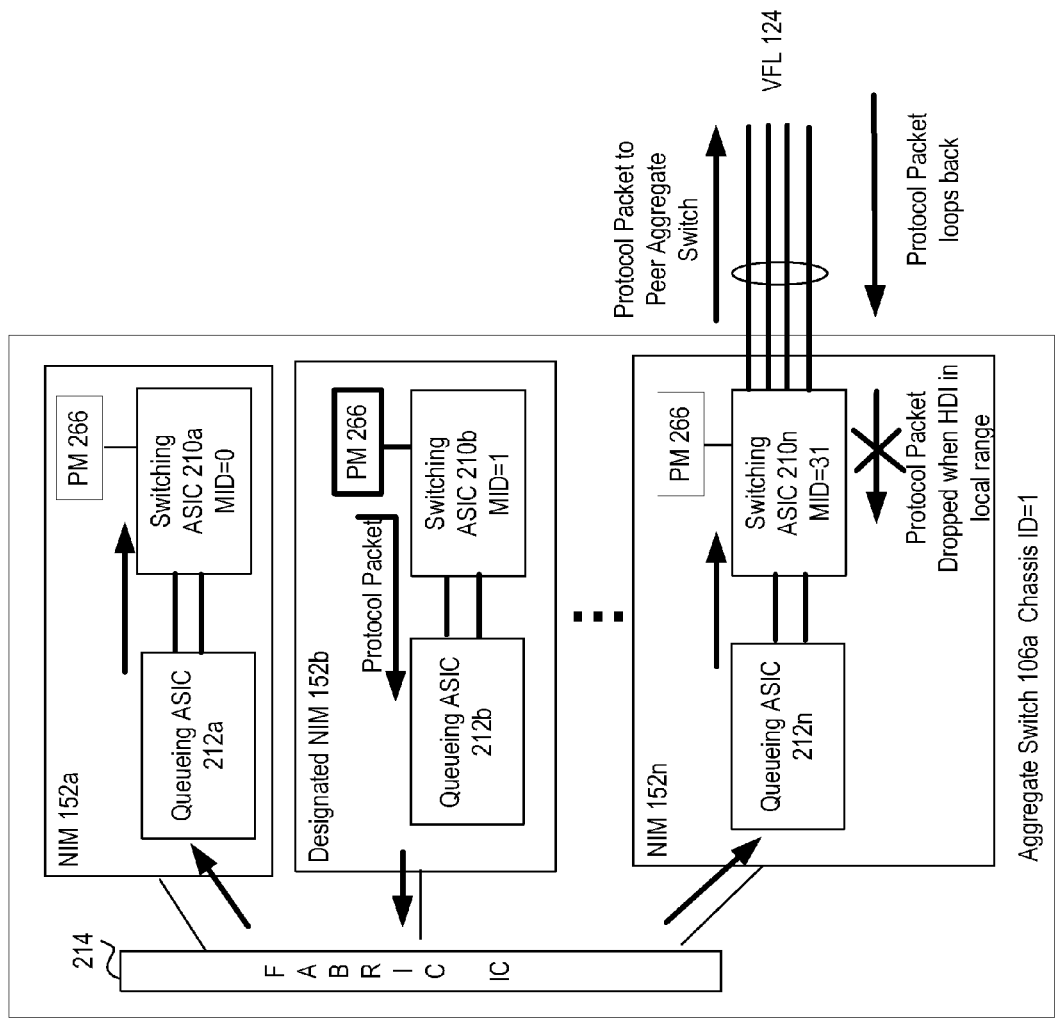
FIG. 11 illustrates a schematic block diagram of another embodiment of a transport control protocol operating in a multi-chassis domain for loop prevention in accordance with the present invention.

As seen in FIG. 10, the destination PM 266 in Aggregation Switch 106*b* may provide the packet to the Switching ASIC 210*n* and create a loop back to the originating PM 266 in Aggregation Switch 106*a*. To avoid loops, as shown in FIG. 11, the source hardware device information in the packet pre-pended header is used to filter looped-back protocol packets. As described herein, the Switching ASICs 210 in the Aggregation Switches 106 are assigned a global unique hardware device identifier (MID) in a reserved range to its Aggregation Switch, such as MID=0-31 are reserved for Aggregation Switch 106*a* with Chassis ID=1 and MID=32-63 are reserved for Aggregation Switch 106*b*. The Switching ASICs 210 are thus able to filter a protocol packet based on the reserved range of hardware device identifiers. For example, when Switching ASIC 210*n* in Aggregation Switch 106*a* receives a looped back protocol packet over a VFL member port, it determines the source hardware device information from the pre-pended header. The Switching ASIC 210*n* discards a protocol packet received on the VFL member port when the source hardware device information (such as MID of the Switching ASIC) for the protocol packet includes a hardware device identifier within the reserved range assigned to the Aggregation Switch 106*a*. For example, Switching ASIC 210*n* with MID=31 in Aggregation Switch 106*a* will drop a protocol packet received from VFL 124 with a source hardware device information within a local reserved range of global unique hardware device identifiers MIDs from 0-31.

FIG. 12 illustrates an embodiment of a pre-pended header for a protocol packet in accordance with the transport control protocol. The source hardware device information 302 of the pre-pended header 500 includes the PM port ID 502 of the originating designated PM 266, e.g. the port connecting the PM 266 to the switching ASIC 210 in the designated NIM 152. The source hardware device information 302 also includes hardware device identifiers 504 that are partitioned into reserved ranges for each of the Aggregation Switches, such as MIDs of the Switching ASICs 210. The destination HDI 304 may be blank or include a default value. The VLAN ID 306 in the pre-pended header 500 includes the transport VLAN ID 508, and the packet type indicator 308 includes a multicast packet index 510. The source MAC address 310 includes a corresponding MAC address of the originating Aggregation Switch 512. The destination MAC address 312 includes the multicast group MAC address 514 of the ports needing to receive the protocol packet as described with respect to FIG. 9. The pre-pended header for the protocol packet also may include a load balance identifier and packet priority as described with respect to FIG. 7.

In an embodiment, the transport control protocol has the advantage to communicate generic multi-chassis protocol data unit content and exchange this information between various types of network devices in a multi-chassis system over a dedicated virtual fabric link based on pre-pended headers. The transport control protocol is operable in switches having different platforms using distinct types of hardware (e.g. switching ASICs) with minimal or no prior communication or exchange of parameters of explicit configuration between the Aggregation Switches. The transport control protocol is capable in embodiments of quickly re-converging due to topology changes between the nodes or due to failures. In addition, the transport control protocol does not require a specific location of the processing module that is generating and processing the protocol packets.

The NIMs 152 and/or CMMs 150 include one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The NIMs 152 and/or CMMs 150 include a memory that is an internal memory or an external memory. The memory of the NIMs 152 and/or CMMs 150 may be a single memory device or a plurality of memory devices. Such a memory device may be a read-only memory, random access memory, volatile memory, non-volatile memory, static memory, dynamic memory, flash memory, cache memory, and/or any device that stores digital information. The NIMs 152 and/or CMMs 150 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The NIMs 152 and/or CMMs 150 may execute hard-coded and/or software and/or operational instructions stored by the internal memory and/or external memory to perform the steps and/or functions described herein. The NIMs 152 and/or CMMs 150 may be implemented in a single or in one or more integrated circuits.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. An aggregation switch in a multi-chassis system, comprising:
 a virtual fiber link connected to a remote aggregation switch, wherein the remote aggregation switch is in a separate physical chassis;
 a first designated network interface module having a first designated processing module for processing protocol packets, wherein the first designated network interface module is operable to:
  generate a protocol packet with a pre-pended header, wherein the pre-pended header includes source hardware device information associated with the aggregation switch and a destination address for a multicast group of a plurality of specific ports in the aggregation switch and the remote aggregation switch, wherein the multicast group includes at least a first processing module port for the first designated processing module and a second processing module port for a second designated processing module for processing protocol packets in a second designated network interface module in the remote aggregation switch; and
  transmit the protocol packet with the pre-pended header to the plurality of specific ports in the remote aggregation switch over the virtual fiber link and to the plurality of specific ports in the aggregation switch.

2. The aggregation switch of claim 1, wherein the plurality of specific ports in the multicast group further includes:
one or more internal ports between a first queuing circuit and a first switching circuit in the first designated network interface module in the aggregation switch;
one or more internal ports between a second queuing circuit and a second switching circuit in the second designated network interface module in the remote aggregation switch; and
member ports of the virtual fiber link in the aggregation switch and the remote aggregation switch.

3. The aggregation switch of claim 2, wherein in response to a failure affecting the first processing module, the multicast group is updated to remove the first processing module port in the first designated network interface module and to add a third processing module port in a back-up designated network interface module in the aggregation switch.

4. The aggregation switch of claim 3, wherein the multicast group is updated to add and remove one or more of the member ports of the virtual fiber link in response to status updates on the member ports of the virtual fiber link.

5. The aggregation switch of claim 1, wherein the source hardware device information in the pre-pended header of the protocol packet includes a global unique hardware device identifier in a range assigned to the aggregation switch originating the protocol packet.

6. The aggregation switch of claim 5, wherein the global unique hardware device identifier identifies a first switching circuit in the first designated network interface module that is connected to the first processing module.

7. The aggregation switch of claim 6, wherein the source hardware device information further includes a port identifier for a port connecting the first processing module to the first switching circuit.

8. The aggregation switch of claim 7, wherein the first switching circuit in the aggregation switch is operable to:
receive a looped back protocol packet from the remote aggregation switch over the virtual fiber link;
determine the source hardware device information from a pre-pended header of the looped back protocol packet; and
when the source hardware device information includes the global unique hardware device identifier in the range assigned to the aggregation switch, drop the looped back protocol packet.

9. A method for transporting protocol packets by an aggregation switch operable in a multi-chassis system, comprising:
designating a first primary network interface module from a plurality of network interface modules in the aggregation switch;
designating a first processing module in the first primary network interface module to process protocol packets for the aggregation switch;
generating a multicast group of a plurality of specific ports, wherein the specific ports include at least a first processing module port for the designated first processing module in the first primary network interface module in the aggregation switch and a second processing module port for a designated second processing module in a second primary network interface module in a remote aggregation switch having a separate physical chassis and wherein the designated second processing module processes protocol packets for the remote aggregation switch;
generating by the first processing module a protocol packet with a pre-pended header, wherein the pre-pended header includes source hardware device information for the first primary network interface module and a destination address for the multicast group;
transmitting the protocol packet with the pre-pended header to the plurality of specific ports in the multicast group in the aggregation switch; and
transmitting the protocol packet with the pre-pended header over a virtual fiber link to the remote aggregation switch.

10. The method of claim 9, wherein the plurality of specific ports in the multicast group further includes:
one or more internal ports between a first queuing circuit and a first switching circuit in the first primary network interface module in the aggregation switch;
one or more internal ports between a second queuing circuit and a second switching circuit in the second primary network interface module in the remote Aggregation Switch; and
member ports of the virtual fiber link in the aggregation switch and the remote Aggregation Switch.

11. The method of claim 10, further comprising:
in response to a failure affecting the first processing module in the first primary network interface module, updating the multicast group to remove the first processing module port in the first primary network interface module and adding a third processing module port in a back-up network interface module in the aggregation switch to the multicast group.

12. The method of claim 11, further comprising:
updating the multicast group to add and remove one or more of the member ports of the virtual fiber link in response to status updates on the member ports of the virtual fiber link.

13. The method of claim 9, wherein the source hardware device information in the pre-pended header of the protocol packet includes a global unique hardware device identifier in a range assigned to the aggregation switch originating the protocol packet.

14. The method of claim 13, wherein the global unique hardware device identifier identifies a first switching circuit in the first primary network interface module that is connected to the first processing module.

15. The method of claim 14, wherein the source hardware device information further includes a port identifier for a port connecting the first processing module to the first switching circuit.

16. The method of claim 15, further comprising:
receiving a looped back protocol packet from the remote aggregation switch over the virtual fiber link;
determining the source hardware device information from a pre-pended header of the looped back protocol packet; and
when the source hardware device information includes the global unique hardware device identifier in the range assigned to the aggregation switch, dropping the looped back protocol packet.

17. An aggregation switch in a multi-chassis system, comprising:
a virtual fiber link connected to a remote aggregation switch, wherein the remote aggregation switch is in a separate physical chassis;
a first primary network interface module of a plurality of network interface modules in the aggregation switch including a designated first processing module for processing protocol packets for the aggregation switch, wherein the first primary network interface module is operable to:

generate a multicast group of a plurality of specific ports, wherein the specific ports include at least a first processing module port for the designated first processing module in the first primary network interface module in the aggregation switch and a second processing module port for a designated second processing module in a second primary network interface module in the remote aggregation switch and wherein the designated second processing module processes protocol packets for the remote aggregation switch;

generate a protocol packet with a pre-pended header, wherein the pre-pended header includes source hardware device information associated with the first primary network interface module and a destination address for the multicast group;

transmit the protocol packet with the pre-pended header to the plurality of specific ports in the multicast group in the aggregation switch; and transmit the protocol packet with the pre-pended header over the virtual fiber link to the remote aggregation switch.

18. The aggregation switch of claim 17, wherein the first primary network interface module in the aggregation switch is further operable to:

receive a looped back protocol packet from the remote aggregation switch over the virtual fiber link;

determine the source hardware device information from a pre-pended header of the looped back protocol packet; and when the source hardware device information is associated with the aggregation switch, drop the looped back protocol packet.

19. The aggregation switch of claim 17, further comprising:

a memory that stores one or more address tables including a mapping of hardware device information corresponding to the aggregate switch and the remote aggregate switch, wherein the hardware device information includes the specific ports in the multicast group for the aggregate switch and the remote aggregate switch.

* * * * *